United States Patent
Okuyama et al.

(10) Patent No.: US 6,938,419 B2
(45) Date of Patent: Sep. 6, 2005

(54) CONTROL APPARATUS FOR INTERNAL COMBUSTION ENGINE HAVING MOTOR-DRIVEN SUPERCHARGER

(75) Inventors: Akihide Okuyama, Okazaki (JP); Chika Kanba, Susono (JP); Osamu Igarashi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/819,125

(22) Filed: Apr. 7, 2004

(65) Prior Publication Data

US 2004/0206083 A1 Oct. 21, 2004

(30) Foreign Application Priority Data

Apr. 16, 2003 (JP) ........................ 2003-111883
Oct. 1, 2003 (JP) ........................ 2003-343445

(51) Int. Cl.[7] ................. F02B 37/10; F02B 33/44; F02D 23/00; F02D 23/02
(52) U.S. Cl. ................. 60/605.1; 60/600; 60/611; 123/565
(58) Field of Search .............. 60/605.1, 607, 60/608, 600, 611; 123/565

(56) References Cited

U.S. PATENT DOCUMENTS 5,526,645 A * 6/1996 Kaiser ................. 60/611
5,605,045 A * 2/1997 Halimi et al. ............. 60/607
6,363,721 B1 * 4/2002 Prenninger et al. ......... 60/611
6,609,375 B2 * 8/2003 Allen et al. ............. 60/607
6,701,710 B1 * 3/2004 Ahrens et al. ............ 60/611
6,722,128 B1 * 4/2004 Adrian ................. 60/611

FOREIGN PATENT DOCUMENTS

DE           3804013 A * 2/1989 ......... F02B/37/10
JP           A 5-321682    12/1993
JP           A 6-323151    11/1994

* cited by examiner

*Primary Examiner*—Sheldon J Richter
(74) *Attorney, Agent, or Firm*—Oliff & Berridge, PLC

(57) ABSTRACT

A control apparatus for an internal combustion engine which is mounted in a vehicle and has a supercharger that is located along an intake passage of the internal combustion engine and driven by a motor, includes a controller which drives the motor to perform supercharging during warm-up of the internal combustion engine, and supercharges a plurality of times intake air to be supplied to the internal combustion engine. Accordingly, the intake air is supercharged a plurality of times during warm-up of the internal combustion engine, so the temperature of the intake air is raised sufficiently to warm up the engine, thus enabling the engine to be warmed up effectively.

18 Claims, 3 Drawing Sheets

CONTROL APPARATUS FOR INTERNAL COMBUSTION ENGINE HAVING MOTOR-DRIVEN SUPERCHARGER

INCORPORATION BY REFERENCE

The disclosure of Japanese Patent Application No. 2003-111883 filed on Apr. 16, 2003 and No. 2003-343445 filed on Oct. 1, 2003, including the specifications, drawings and abstracts are incorporated herein by reference in their entirety.

BACKGROUND OF THE INVENTION

1. Field of the Invention

The invention relates to a control apparatus for controlling an internal combustion engine having a motor-driven supercharger provided along an intake passage.

2. Description of the Related Art

Attempts are known to have been made to achieve high output (or low fuel consumption) by supercharging using a motor-driven supercharger disposed along an intake passage of an engine. Attempts are also known to have been made to improve startability and warm-up capability of the engine using this kind of supercharger. One such engine is also disclosed in JP(A) 5-321682. In the engine (internal combustion engine) disclosed in that publication, a motor for the motor-driven supercharger is driven immediately after the engine is started, using power from a generator that generates power from engine output, which increases the engine load and improves warm-up capability of the engine.

In the engine disclosed in JP(A) 5-321682, the intake air temperature rises as the pressure increases by the supercharging, which may also improve the warm-up capability. Operation of the engine in the foregoing publication, however, tends to be unstable because of the increased engine load immediately after startup. Also, the effect achieved from the rise in intake air temperature following the increase in pressure by supercharging was inadequate.

SUMMARY OF THE INVENTION

In view of the foregoing problems, one exemplary embodiment of the invention thus provides a control apparatus, described below, for an internal combustion engine having a motor-driven supercharger, which is able to reliably improve startability and warm-up capability of the internal combustion engine.

A first aspect of the invention relates to a control apparatus for an internal combustion engine which is mounted in a vehicle and has a motor-driven supercharger that is located along an intake passage of the internal combustion engine and driven by a motor. This control apparatus is provided with a controller that drives the motor to perform supercharging during warm-up of the internal combustion engine and performs control for supercharging a plurality of times intake air to be supplied to the internal combustion engine.

A second aspect of the invention relates to a control apparatus for an internal combustion engine which is mounted in a vehicle and has a motor-driven supercharger that is located along an intake passage of the internal combustion engine and driven by a motor. This control apparatus is provided with warm-up time supercharging means for driving the motor to perform supercharging during warm-up of the internal combustion engine, and repetitive supercharging means for supercharging a plurality of times intake air to be supplied to the internal combustion engine with the warm-up time supercharging means.

According to the control apparatus as structured above, the intake air to be supplied to the internal combustion engine is supercharged a plurality of times by performing repetitive supercharging when the motor is driven to perform supercharging during warm-up of the internal combustion engine. As a result, the temperature of the intake air is raised sufficiently to warm up the engine, so the engine is able to be warmed up effectively. Furthermore, performing repetitive supercharging before starting the internal combustion engine warms up the internal combustion engine, which improves startability.

BRIEF DESCRIPTION OF THE DRAWINGS

The above-mentioned embodiment and other embodiments, objects, features, advantages, technical and industrial significance of this invention will be better understood by reading the following detailed description of the preferred embodiments of the invention, when considered in connection with the accompanying drawings, in which.

DETAILED DESCRIPTION OF THE PREFERRED EMBODIMENTS

Figure 1:
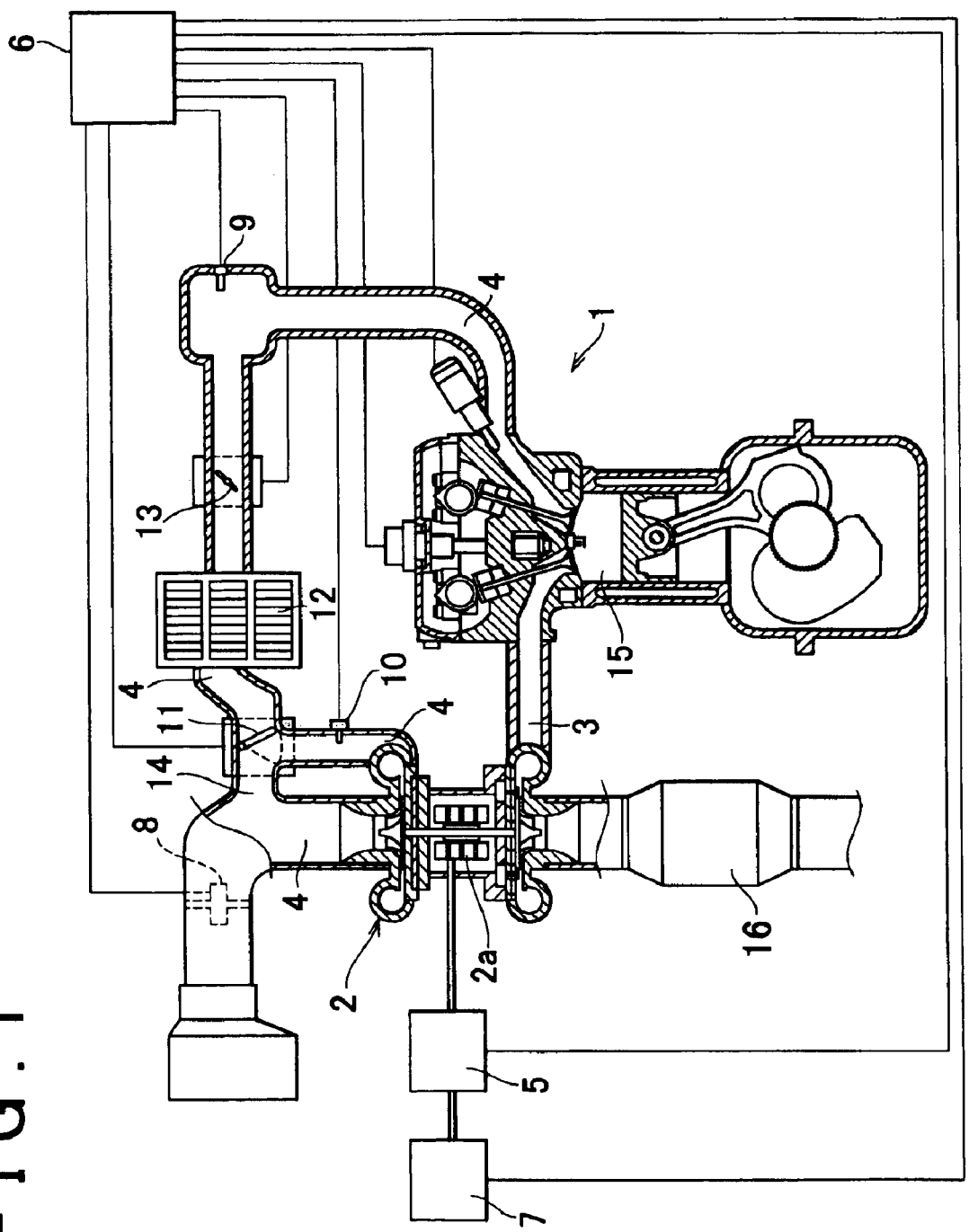
FIG. 1 is a block diagram of the structure of an internal combustion engine (i.e., engine) provided with a control apparatus according to one exemplary embodiment of the invention.

In the following description and the accompanying drawings, the present invention will be described in more detail with reference to exemplary embodiments. FIG. 1 shows an engine 1 that is provided with a control apparatus according to one exemplary embodiment of the invention.

The engine 1 described in this exemplary embodiment is a multiple cylinder engine. Only one of those cylinders, however, is shown in the sectional view of FIG. 1. The engine 1 is provided with a turbocharger (i.e., a supercharger) 2. In the turbocharger 2, a turbine wheel disposed in an exhaust passage 3 is connected by a rotating shaft to a compressor wheel disposed in an intake passage 4. This structure is the same as in an ordinary turbocharger. The turbocharger according to this exemplary embodiment, however, houses a motor 2a such that the rotating shaft becomes an output shaft.

This motor 2a is connected to a controller 5, which is connected to a battery 7 and an electronic control unit (ECU) 6 that controls the overall engine 1. The ECU 6 and the controller 5 control the power applied to the motor 2a, which determines the rotational speed of the motor 2a. That is, the boost pressure generated when the turbocharger 2 is driven by the motor is controlled by controlling the rotational speed of the motor 2a. Detection results from, for example, an air flow meter 8 located upstream of the turbocharger 2 in the intake passage 4 and a pressure sensor 9 provided in a surge tank in the intake passage 4 are used in controlling the boost pressure. These sensors are connected to the ECU 6.

Between the turbocharger 2 and the surge tank in which the pressure sensor 9 is located are provided, in order from upstream to downstream, a temperature sensor 10, a switching valve 11, an intercooler 12, and a throttle valve 13. Further, a connecting passage 14 connects the intake passage 4 upstream of the turbocharger 2 with the intake passage 4 downstream of the turbocharger 2. The switching valve 11 is a three-way valve that is provided at a junction where the connecting passage 14 and the intake passage 4 downstream of the turbocharger 2 join. The position of the switching valve 11 determines whether the intake air supercharged by the turbocharger 2 is circulated back upstream through the connecting passage 14 or channeled downstream to be supplied to a cylinder 15 of the engine 1.

This switching valve 11 is also connected to, and controlled by, the ECU 6. The switching valve 11 is an electromagnetic valve or the like. The position of the switching valve 11 is changed by the ECU 6 when appropriate in order to create the appropriate flow path. The temperature sensor 10, which is also connected to the ECU 6, detects an intake air temperature of the intake air supercharged by the turbocharger 2. The engine 1 of the above described structure is able to be warmed up by driving the motor 2a and performing supercharging prior to being started. Here, warming up of the engine may refer to the warming up of only the engine 1 itself, the warming up of an exhaust gas control catalyst 16 in the exhaust passage 3, or both. Supercharging increases the intake air pressure. As the pressure increases, the temperature rises and warms up the various parts of the engine. This was described in the related art.

In this exemplary embodiment, in order to more reliably ensure this warming effect before starting of the engine 1, the flow of intake air supercharged by the turbocharger 2 is repeatedly recirculated upstream again through the connecting passage 14 and supercharged during warm-up prior to starting the engine. Performing repetitive supercharging (i.e., supercharging a plurality of times) raises the intake air temperature to a temperature sufficient for warming the engine, so the engine can be warmed up effectively. A description of the control thereof is as follows. In this control, the ECU 6 and the controller 5 serve as the warm-up time supercharging means. Also, the switching valve 11 serves as the intake air switching means. This switching valve 11 and the connecting passage 14 serve as the repetitive supercharging means.

Figure 2:
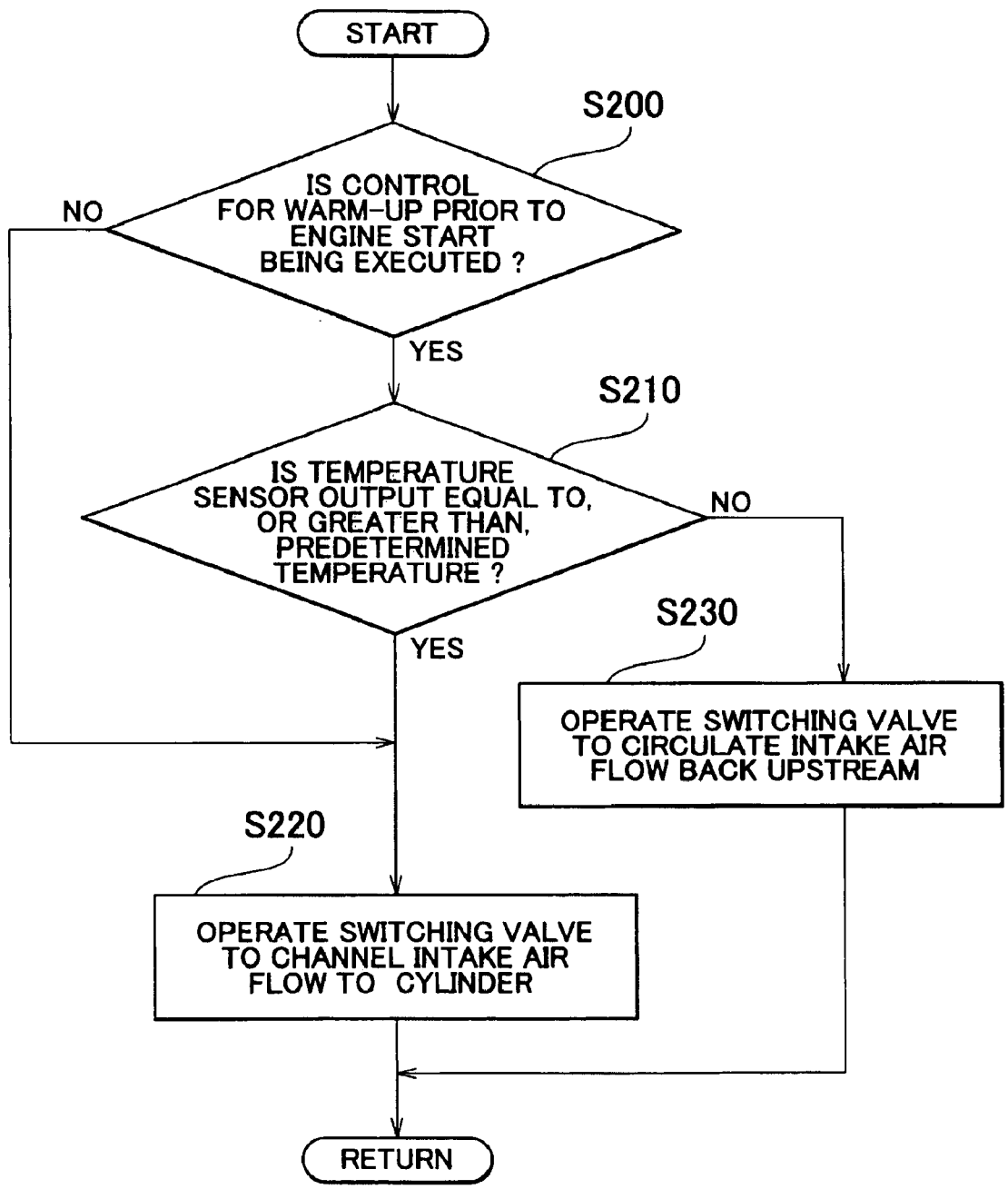
FIG. 2 is a flowchart of a control by the control apparatus according to the exemplary embodiment of the invention.

FIG. 2 is a flowchart of the switching control for the switching valve 11. The control of the motor 2a for warming the engine up prior to engine start is performed according to another routine. Also, the control shown in the flowchart in FIG. 2 starts when a condition, being that it is predicted that the engine 1 will likely be started, is fulfilled. The condition, may be, for example, that a door of the vehicle equipped with the engine 1 has been opened, a seat sensor has detected that a driver is sitting in a driver's seat, or it has been detected that a key to start the engine has been inserted into a key cylinder. The control of the motor 2a in the warm-up control prior to engine start also starts at the point when this type of condition has been fulfilled.

First it is determined whether warm-up prior to engine start is being performed by driving the motor 2a (step S200). If the motor 2a is being driven but the engine 1 is not yet running, it is determined that warm-up prior to engine start is being performed. If the engine 1 is not yet running and the motor 2a also not being driven, warm-up prior to engine start is not performed. If the control for warm-up prior to engine start is not being executed (either before the start of warm-up prior to engine start or after warm-up is finished), the switching valve 11 is switched (step S220) to a position so that the intake air flow is channeled into the cylinder 15 as normal, and the routine ends. If, on the other hand, the control for warm-up prior to engine start is being executed, it is determined whether the temperature detected by the temperature sensor 10 is equal to, or greater than, a predetermined temperature (step S210).

This predetermined temperature is set to a temperature sufficient for warming up the engine. If the determination in step S210 is no, i.e., if the intake air temperature has not reached the predetermined temperature, the switching valve 11 is switched to a position that circulates the flow of intake air back upstream (step S230). After step S230, the routine is executed again from step S200. The recirculated intake air is again supercharged by the turbocharger 2, which again raises its temperature. This recirculating and supercharging is repeated until the temperature of the intake air reaches the predetermined temperature. Even if the determination in step S210 is no such that step S230 is performed, when the intake air temperature finally reaches the predetermined temperature, the determination in step S210 changes to yes and the switching valve 11 is switched to a position that channels the intake air flow into the cylinder 15 as normal (step S220).

Warming the engine up using the intake air that has been sufficiently heated in this way warms up each part of the engine. If the temperature detected by the temperature sensor 10 is less than the predetermined temperature due to the intake air that was sufficiently heated flowing on to the cylinder 15, the switching valve 11 is switched to a position that circulates the flow of intake air back upstream so as to sufficiently raise its temperature. Accordingly, engine warm-up can be done effectively. Also, sufficiently raising the temperature of the intake air promotes vaporization of the fuel, which also improves startability.

Warm-up of the engine by driving the motor 2a is not limited to being performed before the engine 1 is started (i.e., warm-up prior to engine start) but may also be continued after the engine has been started as well. In this case, as well, the switching valve 11 can be operated based on the driving state of the motor 2a and the detection results from the temperature sensor 10. Alternatively, engine warm-up by driving the motor 2a may be started after the engine 1 has been started, and used to promote quick warm-up.

Further, according to the exemplary embodiment, surging in the turbocharger 2 after the engine 1 is started can also be avoided by using the connecting passage 14. Surging, which is due to a rapid fluctuation in pressure, may occur in the turbocharger 2. The fluctuation in pressure during surging is rapid and causes the turbocharger 2 to vibrate, as well as generates noise. In order to avoid damage to the turbocharger 2 and keep it operating quietly, it is therefore necessary to prevent the turbocharger 2 from surging. For this purpose, whether or not surging will occur is predicted, and when it is predicted that surging will occur, the intake air downstream of the turbocharger 2, which is at a higher pressure due to supercharging, is recirculated back upstream to mitigate the pressure fluctuation.

According to this exemplary embodiment, the prediction of the occurrence of surging is based on an air flow quantity of the compressor in the turbocharger 2 and the boost pressure generated by the turbocharger 2. If the boost pressure is higher than a predetermined boost pressure, it is predicted that surging will occur. This predetermined boost pressure is set to a lower value the smaller the air flow quantity. That is, when the air flow quantity is small, it is predicted that surging will occur at a lower boost pressure compared to when the air flow quantity is large. In this exemplary embodiment, the occurrence of surging is predicted based on the air flow quantity of the compressor in the turbocharger 2 obtained from a value of the air flow meter 8, and the boost pressure generated by the turbocharger 2 that was calculated from the detection value from the pressure sensor 9 and the rotational speed of the turbocharger 2.

In this case, when it is predicted that surging will occur, the switching valve 11 is switched to a position so that the flow of intake air is circulated back upstream, thereby inhibiting the occurrence of surging. The invention, however, is not limited to the foregoing exemplary embodiment. For example, in the exemplary embodiment shown in FIG. 1, the motor 2a is housed in the turbocharger 2. Alternatively, the invention may also be applied to a supercharger that performs supercharging simply by driving a motor (without using the energy of exhaust gas) (e.g., a so-called "supercharger").

Figure 3:
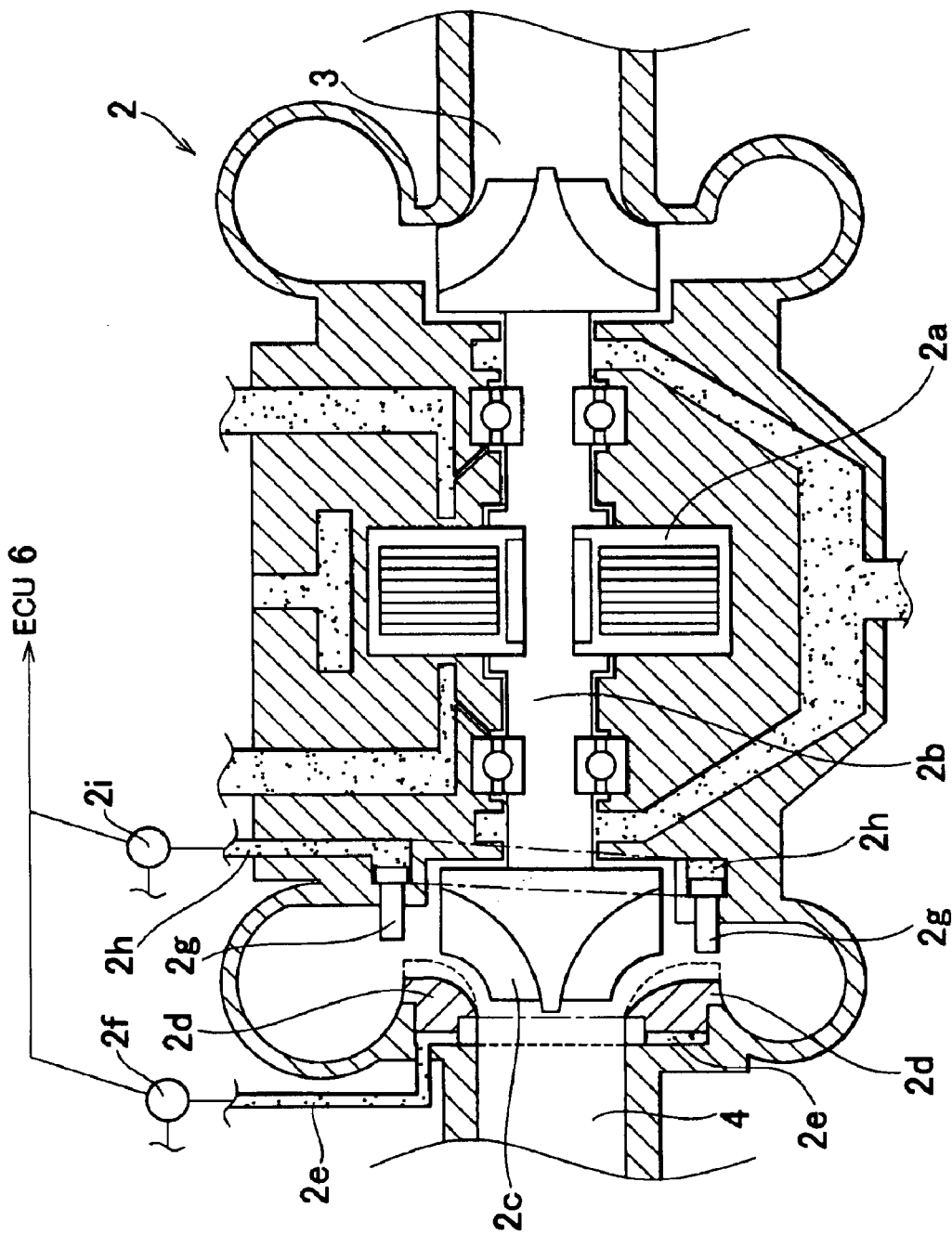
FIG. 3 is a sectional view of a turbocharger in the control apparatus according to the exemplary embodiment of the invention.

Further, the foregoing exemplary embodiment also includes a mechanism which reduces the supercharging efficiency of the turbocharger 2. In the exemplary embodiment, this mechanism intentionally reduces the supercharging efficiency when warming up the engine by supercharging by driving the motor 2a and recirculating intake air that has already been supercharged. This mechanism is shown in FIG. 3. As shown in the drawing, two mechanisms that reduce supercharging efficiency are incorporated near a compressor wheel 2c of a turbine/compressor 2b of the turbocharger 2. The first of these mechanisms varies the distance between the compressor wheel 2c and the inside wall surface of the turbocharger 2. In this mechanism, part of the inside wall portion of the turbocharger 2 is constructed as a movable wall portion 2d.

The movable wall portion 2d is shown in the drawing in a state in which it has been moved all the way to the left in the drawing, but it is also able to be moved, with hydraulic pressure controlling the movement, to the position shown by the dotted line in the drawing. The state shown in the drawing is a state that provides a large sectional area of the intake passage, thereby reducing supercharging efficiency. During normal supercharging not during engine warm-up (i.e., when increasing the output of the engine), the movable wall portion 2d is in the position shown by the dotted line in the drawing. The movable wall portion 2d is moved using an oil passage 2e formed in the turbocharger 2 and a pump 2f which increases or decreases the oil pressure within the oil passage 2e. The pump 2f is connected to the ECU 6, which controls the position of the movable wall portion 2d. The movable wall portion 2d according to this exemplary embodiment is annular, but it may also be formed such that only a portion of the annular portion moves (e.g., it may also be formed as a plurality of movable portions arranged in a circle at predetermined intervals).

The second mechanism that reduces the supercharging efficiency is a plurality of protrusions 2g which protrude so as to block the flow of intake air discharged from the compressor wheel 2c of the turbocharger 2. The protrusions 2g in the drawing are arranged in a circle at predetermined intervals. A base end portion of each protrusion 2g is positioned in an annular oil passage 2h formed in the turbocharger 2. When the hydraulic pressure in the oil passage 2h is high, these protrusions 2g are forced out so that they protrude into the intake passage 4. When the hydraulic pressure in the oil passage 2h is low, the protrusions 2g draw back so that they no longer protrude into the intake passage 4. In FIG. 3, the protrusions 2g are shown protruding into the intake passage 4. When the protrusions 2g are in this state, they create a disturbance in the flow of the intake air, thereby reducing supercharging efficiency. The oil passage 2h is connected to a pump 2i that increases and decreases the hydraulic pressure inside the oil passage 2h. This pump 2i is connected to the ECU 6, which controls the positions of the protrusions 2g.

When the motor 2a is driven to warm up the engine (also when supercharged intake air is recirculated, in this exemplary embodiment), the intake air temperature can be increased by reducing the supercharging efficiency using these mechanisms. With an equivalent pressure ratio (i.e., the pressure ratio between the upstream side of the turbocharger 2 and the downstream side of the turbocharger 2) and equivalent flow rate, the amount of increase in the temperature of the intake air flow is greater the lower the supercharging efficiency. To achieve an increase in output from the engine 1, it is better to reduce the intake air temperature, increase the intake air density, improve the supercharging efficiency, and increase the amount of air charged into the cylinder. In this exemplary embodiment, however, just the opposite is done. That is, the supercharging efficiency is intentionally reduced to increase the intake air temperature and further improve the engine warm-up capability.

The reduction in supercharging efficiency using the movable wall portion 2d and the reduction in supercharging efficiency using the protrusions 2g may both be performed simultaneously, or only one may be performed at any one time. Performing both together, however, more effectively reduces the supercharging efficiency. When the supercharging efficiency is reduced, the rotational speed of the turbine/compressor 2b slows. In order to make up for this slow down in rotational speed of the turbine/compressor 2b, the motor 2a is driven with increased force to keep the turbine/compressor 2b rotating at a high speed, which increases the adiabatic compression temperature, thereby making it possible to achieve a large warm-up effect. Even if the motor 2a is not driven with increased force but with a constant force, however, a warm-up capability improvement effect is still able to be achieved. At this time, after the supercharging efficiency has been reduced using the mechanisms described above to make the boost pressure generated by the turbocharger 2 equal to a predetermined value, the warm-up capability improvement effect can be efficiently achieved by controlling the driving force of the motor 2a.

The invention is not limited to the foregoing exemplary embodiments. For example, in the exemplary embodiment described above, the switching valve 11, which is a three-way valve, serves as the intake air flow switching means. Instead of the one switching valve 11, however, it is possible to two valves to perform the same function. That is, by providing a valve which opens and closes the passage on the right side of the switching valve in FIG. 1 and a valve which opens and closes the passage on the left side of the switching valve in the same drawing, and opening one of the valves while closing the other, it is possible to channel the intake air so that it only flows into the open passage.

Also in this exemplary embodiment, the intake air temperature is monitored by the temperature sensor 10 and the switching valve 11 is switched depending on whether the detected intake air temperature is equal to, or greater than, the predetermined temperature. However, if the intake air temperature is detected once by the temperature sensor 10 during startup of the engine 1 and the temperature at that time is less than the predetermined value, the switching valve 11 may also be switched for a predetermined period of time to a position to circulate the intake air flow back upstream (and then switched to a position to channel the intake air flow to the cylinder 15 as usual).

Further in the foregoing exemplary embodiment, the detection results from the temperature sensor 10 are also used when switching the switching valve 11 based on the driving state of the motor 2*a* at warm-up prior to engine start. Alternatively, however, the switching valve 11 may also be switched based on just the driving state of the motor 2*a* at warm-up prior to engine start (i.e., based only on whether the motor 2*a* is being driven for warm-up prior to engine start), without using the detection results from the temperature sensor 10. For example, when the motor 2*a* is being driven for warm-up prior to engine start, the switching valve 11 may be switched for a predetermined period of time to the position to circulate the intake air flow back upstream (and then switched to the position to channel the intake air flow to the cylinder 15 as usual).

Also, even if the supercharger that is driven by the motor is arranged in series in the intake passage (e.g., if a supercharger driven only by a motor and a motor-driven turbocharger are arranged in series), the intake air flow can be supercharged a plurality of times by the motor-driven supercharger. Even with this kind of control, the temperature of the intake air is able to be raised sufficiently by repeatedly supercharging the air (i.e., by supercharging the air a plurality of times) with the turbocharger 2 having the motor 2*a*, thereby enabling effective warm-up of the engine.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A control apparatus for an internal combustion engine which is mounted in a vehicle and has a supercharger that is located along an intake passage of the internal combustion engine and driven by a motor, the control apparatus comprising:
    a controller which drives the motor to perform supercharging during warm-up of the internal combustion engine, and supercharges a plurality of times intake air to be supplied to the internal combustion engine,
        wherein the controller warms up the internal combustion engine before the internal combustion engine is started.

2. The control apparatus according to claim 1, wherein the controller repeatedly recirculates intake air and supercharges a plurality of times the intake air to be supplied to the internal combustion engine.

3. A control apparatus for an internal combustion engine which is mounted in a vehicle and has a supercharger that is located along an intake passage of the internal combustion engine and driven by a motor, the control apparatus comprising:
    a controller which drives the motor to perform supercharging during warm-up of the internal combustion engine, and supercharges a plurality of times intake air to be supplied to the internal combustion engine,
    wherein the controller has a connecting passage that connects the intake passage upstream of the supercharger with the intake passage downstream of the supercharger, and the controller switches the flow of intake air supercharged by the supercharger so that the intake air is either circulated back to the upstream side of the intake passage via the connecting passage or channeled to the downstream side of the intake passage, and the controller controls the switching of the flow of the intake air between the upstream side of the intake passage and the downstream side of the intake passage based on the driving state of the motor and the controller also predicts the occurrence of a surge in the supercharger and circulates the intake air supercharged by the supercharger back to the upstream side of the intake passage when it is predicted that a surge will occur in the supercharger.

4. The control apparatus according to claim 3, wherein the controller repeatedly recirculates intake air and supercharges a plurality of times the intake air to be supplied to the internal combustion engine.

5. The control apparatus according to claim 3, wherein the controller switches the flow of intake air using a switching valve.

6. A control apparatus for an internal combustion engine which is mounted in a vehicle and has a supercharger that is located along an intake passage of the internal combustion engine and driven by a motor, the control apparatus comprising:
    a controller which drives the motor to perform supercharging during warm-up of the internal combustion engine, and supercharges a plurality of times intake air to be supplied to the internal combustion engine,
    wherein the controller reduces a supercharging efficiency of the supercharger during warm-up of the internal combustion engine by the supercharger.

7. The control apparatus according to claim 6, wherein the reduction in the supercharging efficiency is realized by a mechanism that varies the distance between a compressor wheel of the supercharger and an inside wall surface of the supercharger.

8. The control apparatus according to claim 6, wherein the reduction in the supercharging efficiency is realized by a protrusion that protrudes so as to block the flow of intake air discharged by the compressor wheel of the supercharger.

9. The control apparatus according to claim 6, wherein the controller repeatedly recirculates intake air and supercharges a plurality of times the intake air to be supplied to the internal combustion engine.

10. A control apparatus for an internal combustion engine which is mounted in a vehicle and has a supercharger that is located along an intake passage of the internal combustion engine and driven by a motor, the control apparatus comprising:
    warm-up time supercharging means for driving the motor to perform supercharging during warm-up of the internal combustion engine; and
    repetitive supercharging means for supercharging a plurality of times intake air to be supplied to the internal combustion engine with the warm-up time supercharging means,
    wherein the warm-up time supercharging means warms up the internal combustion engine before the internal combustion engine is started.

11. The control apparatus according to claim 10, wherein the repetitive supercharging means repeatedly recirculates intake air and supercharges a plurality of times the intake air to be supplied to the internal combustion engine with the warm-up time supercharging means.

12. A control apparatus for an internal combustion engine which is mounted in a vehicle and has a supercharger that is located along an intake passage of the internal combustion engine and driven by a motor, the control apparatus comprising:

warm-up time supercharging means for driving the motor to perform supercharging during warm-up of the internal combustion engine;

repetitive supercharging means for supercharging a plurality of times intake air to be supplied to the internal combustion engine with the warm-up time supercharging means;

surge predicting means for predicting the occurrence of a surge in the supercharger; and surge inhibiting means for circulating the intake air supercharged by the supercharger back to the upstream side of the intake passage using the intake air flow switching means when the surge predicting means predicts that a surge will occur in the supercharger.

13. The control apparatus according to claim 12, wherein the repetitive supercharging means repeatedly recirculates intake air and supercharges a plurality of times the intake air to be supplied to the internal combustion engine with the warm-up time supercharging means.

14. The control apparatus according to claim 12, wherein the intake air flow switching means includes a switching valve.

15. A control apparatus for an internal combustion engine which is mounted in a vehicle and has a supercharger that is located along an intake passage of the internal combustion engine and driven by a motor, the control apparatus comprising:

warm-up time supercharging means for driving the motor to perform supercharging during warm-up of the internal combustion engine;

repetitive supercharging means for supercharging a plurality of times intake air to be supplied to the internal combustion engine with the warm-up time supercharging means; and supercharging efficiency reducing means for reducing a supercharging efficiency of the supercharger during warm-up of the internal combustion engine by the warm-up time supercharging means.

16. The control apparatus according to claim 15, wherein the supercharging efficiency reducing means includes a mechanism that varies the distance between a compressor wheel of the supercharger and an inside wall surface of the supercharger.

17. The control apparatus according to claim 15, wherein the supercharging efficiency reducing means includes a protrusion that protrudes so as to block the flow of intake air discharged by the compressor wheel of the supercharger.

18. The control apparatus according to claim 15, wherein the repetitive supercharging means repeatedly recirculates intake air and supercharges a plurality of times the intake air to be supplied to the internal combustion engine with the warm-up time supercharging means.

* * * * *